(12) United States Patent
Larsson et al.

(10) Patent No.: US 8,559,992 B2
(45) Date of Patent: Oct. 15, 2013

(54) COORDINATED MULTIPOINT TRANSMISSION/RECEPTION USER GROUPING

(75) Inventors: Peter Larsson, Solna (SE); Qingyu Miao, Beijing (CN); Jiansong Gan, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 230 days.

(21) Appl. No.: 13/120,152

(22) PCT Filed: Sep. 24, 2008

(86) PCT No.: PCT/SE2008/051070
§ 371 (c)(1),
(2), (4) Date: Jun. 9, 2011

(87) PCT Pub. No.: WO2010/036158
PCT Pub. Date: Apr. 1, 2010

(65) Prior Publication Data
US 2011/0230224 A1    Sep. 22, 2011

(51) Int. Cl.
*H04B 15/00* (2006.01)
(52) U.S. Cl.
USPC ........ 455/501; 455/69; 455/562.1; 455/452.2
(58) Field of Classification Search
USPC ........... 455/501, 517, 509, 452.1, 452.2, 447, 455/453, 500, 66.1, 67.11, 67.13, 562.1; 375/267
See application file for complete search history.

(56) References Cited

U.S. PATENT DOCUMENTS

2011/0003608 A1*   1/2011  Forenza et al. ............... 455/501

FOREIGN PATENT DOCUMENTS

WO    2010/036159 A1    4/2010

OTHER PUBLICATIONS

PCT International Search Report, mailed Jul. 8, 2009, in connection with International Application No. PCT/SE2008/051070.
PCT Written Opinion, mailed Jul. 8, 2009, in connection with International Application No. PCT/SE2008/051070.
Samsung: "Inter-Cell Interference Mitigation Through Limited Coordination" 3GPP Draft; R1-082886,Third Generation Partnership Project, Mobile Competence Centre, 650 Route Des Lucioles, F-06921, Sophia-Antipolis Cedex, France, No. Jeju 20080818, Aug. 18, 2008, XP050316366.
Vemula, M. et al. "Inter-Cell Coordination, Opportunistic Beamforming and Scheduling" IEEE International Conference on Communications, 2006, Jun. 1, 2006, pp. 5319-5324, XP031025760, ISBN: 978-1-4244-0354-7.

(Continued)

*Primary Examiner* — John J Lee
(74) *Attorney, Agent, or Firm* — Potomac Patent Group PLLC

(57) ABSTRACT

User grouping is employed to tradeoff the COMP forward link capacity and required reverse link feedback, which makes the design of COMP practical and flexible. A channel element, such as the large scale fading, is measured for each distributed transmitter and UE pair based on reference signals, and the network receives this information as feedback in the reverse link. The COMP determines a maximum cross interference level $\alpha_{req}$ that is affordable, based on the available reverse link capacity for feedback. If this maximum cross interference level $\alpha_{req}$ is exceeded, geographically separate UEs are divided into as few groups as possible, with UEs within each group separated, and the groups are allocated different time/frequency resource blocks. The grouping is done with the constraint that the cross interference does not exceed $\alpha_{req}$.

7 Claims, 6 Drawing Sheets

(56) References Cited

OTHER PUBLICATIONS

Ericsson: "LTE-Advanced-Coordinated Multipoint transmission/reception" 3GPP Draft; R1-083069, Third Generation Partnership Project, Mobile Competence Centre; 650 Route Des Lucioles, F-06921, Sophia-Antipolis Cedex, France, No. Jeju 20080818, Aug. 18, 2008, XP050316512.

Fujitsu: "Discussion on DL coordinated multipoint transmission" 3GPP Draft; R1-083115, Third Generation Partnership Project, Mobile Competence Centre; 650 Route Des Lucioles, F-06921, Sophia-Antipolis Cedex, France, No. Jeju 20080818, Aug. 18, 2008, XP050316556.

Etri: "Frame Structure to Support Inter-cell Interference Mitigation for Downlink Traffic Channel using Co-MIMO and FFR" IEEE 802.16M-08/017, Jan. 16, 2008, pp. 1-8, XP002532561. Retrieved from the Internet: URL:http://grouper.ieee.org/groups/802/16/tgm/contrib/C80216m-08_017.pdf.

NXP Semiconductors et al. "Feedback and Precoding Techniques for MU-MIMO for LTE-A" 3GPP Draft; R1-08324, Third Generation Partnership Project, Mobile Competence Centre; 650 Route Des Lucioles, F-06921, Sophia-Antipolis Cedex, France, No. Jeju 20080818, Aug. 18, 2008, XP050316656.

Saleh, A. A. M. et al. "Distributed antennas for indoor radio communications" IEEE Transactions on Communications, vol. COM-35, No. 12, pp. 1245-1251, Dec. 1987.

Gan, J. et al. "On sum rate and power consumption of multi-User distributed antenna system with circular antenna layout", EURASIP Journal on Wireless Communications and Networking, vol. 2007, Article ID 89780.

Foschini, G. J. et al. "The value of coherent base station coordination", published in the Proceedings of the 39th Annual Conference on Information Sciences and Systems (CISS '05), Mar. 2005.

\* cited by examiner

COORDINATED MULTIPOINT TRANSMISSION/RECEPTION USER GROUPING

FIELD OF THE INVENTION

The present invention relates generally to wireless communication networks, and in particular to a method of grouping User Equipment (UE) to improve performance in a Coordinated Multipoint Transmission/Reception (COMP) network.

BACKGROUND

A predecessor to Coordinated Multipoint Transmission/Reception (COMP), then denoted Distributed Antenna System (DAS), was originally introduced for coverage improvement in indoor wireless communications, as described by A. A. M. Saleh, A. J. Rustako Jr., and R. S. Roman, in a paper titled "Distributed antennas for indoor radio communications," published in the IEEE Transactions on Communications, vol. 35, no. 12, pp. 1245-1251, 1987. Their approach was directed towards transmission to a single user through a discrete implementation of a leaky feeder. The notion of COMP in contrast enables multiple data streams to be transmitted over an interconnected network of radioheads (or basestations) where the different signals representative of the multiple data streams may be controlled by weightings and distributed to the different radio heads. The idea of COMP may be used in downlink as well as uplink. In this invention we are concerned with downlink only. However, recent studies indicate that DAS can provide not only coverage improvement but also capacity enhancement, as described by J. Gan et al., in a paper titled "On sum rate and power consumption of multi-User distributed antenna system with circular antenna layout," published in the EURASIP Journal on Wireless Communications and Networking, vol. 2007, Article ID 89780.

Techniques exploring the advantages of COMP can be classified into two categories: Single-User COMP (SU-COMP) and Multi-User COMP (MU-COMP). SU-COMP techniques attempt to improve the link quality for a single user by means of spatial multiplexing, or spatial diversity. However, SU-COMP techniques can not manage the mutual interference among users. Accordingly, Radio Resource Management (RRM) schemes are needed for geographically separated users that are using the same time/frequency resources. The reuse distance restricts the capacity increase of SU-COMP.

MU-COMP techniques jointly process signals to/from multiple users and attempt to improve the overall system performance. MU-COMP is quite similar to Multi-User Multiple-Input Multiple-Output (MU-MIMO) systems. Accordingly, techniques developed for MU-MIMO system, such as Zero-Forcing (ZF) beamforming and Dirty Paper Coding (DPC), can be directly applied to MU-COMP. Some of these techniques are described by G. J. Foschini et al., in a paper titled "The value of coherent base station coordination," published in the Proceedings of the 39th Annual Conference on Information Sciences and Systems (CISS '05), March 2005.

MU-COMP techniques can achieve the capacity limit provided by a COMP, as there is no need to separate users in time/frequency to avoid mutual interference, as in SU-COMP. However, for the forward link transmission, the transmitter needs to know all channel state information (CSI), which is impractical to implement.

SU-COMP techniques and MU-COMP techniques employ different approaches to reduce mutual interference among users—SU-COMP uses RRM to separate users and MU-COMP uses signal processing based on CSI. The RRM approach is inefficient, while full knowledge of CSI makes the signal processing approach impractical.

SUMMARY

According to one or more embodiments of the present invention, user grouping is employed to tradeoff the COMP forward link capacity and required reverse link feedback, which makes the design of COMP practical and flexible. The network transmits reference signals from at least two geographically distributed transmit antennas. A channel element, such as the large scale fading, is measured for each distributed transmitter and UE pair, and the network receives this information as feedback in the reverse link. The COMP determines a maximum cross interference level $\alpha_{req}$ that can be supported, based on the available reverse link capacity for feedback. If this maximum cross interference level $\alpha_{req}$ is exceeded, geographically separate UEs are divided into as few groups as possible, and the groups are allocated different time/frequency resource blocks. The grouping is done with the constraint that the cross interference does not exceed $\alpha_{req}$.

With sufficient reverse link capacity, the COMP can increase forward link capacity by grouping more users together, with less separation between users in a group. When the reverse link capacity is constrained, the separation of users in each group is increased by creating more, smaller groups. In this case, all users' QoS can be satisfied, at the cost of some loss in the overall system capacity.

DETAILED DESCRIPTION

Figure 1:
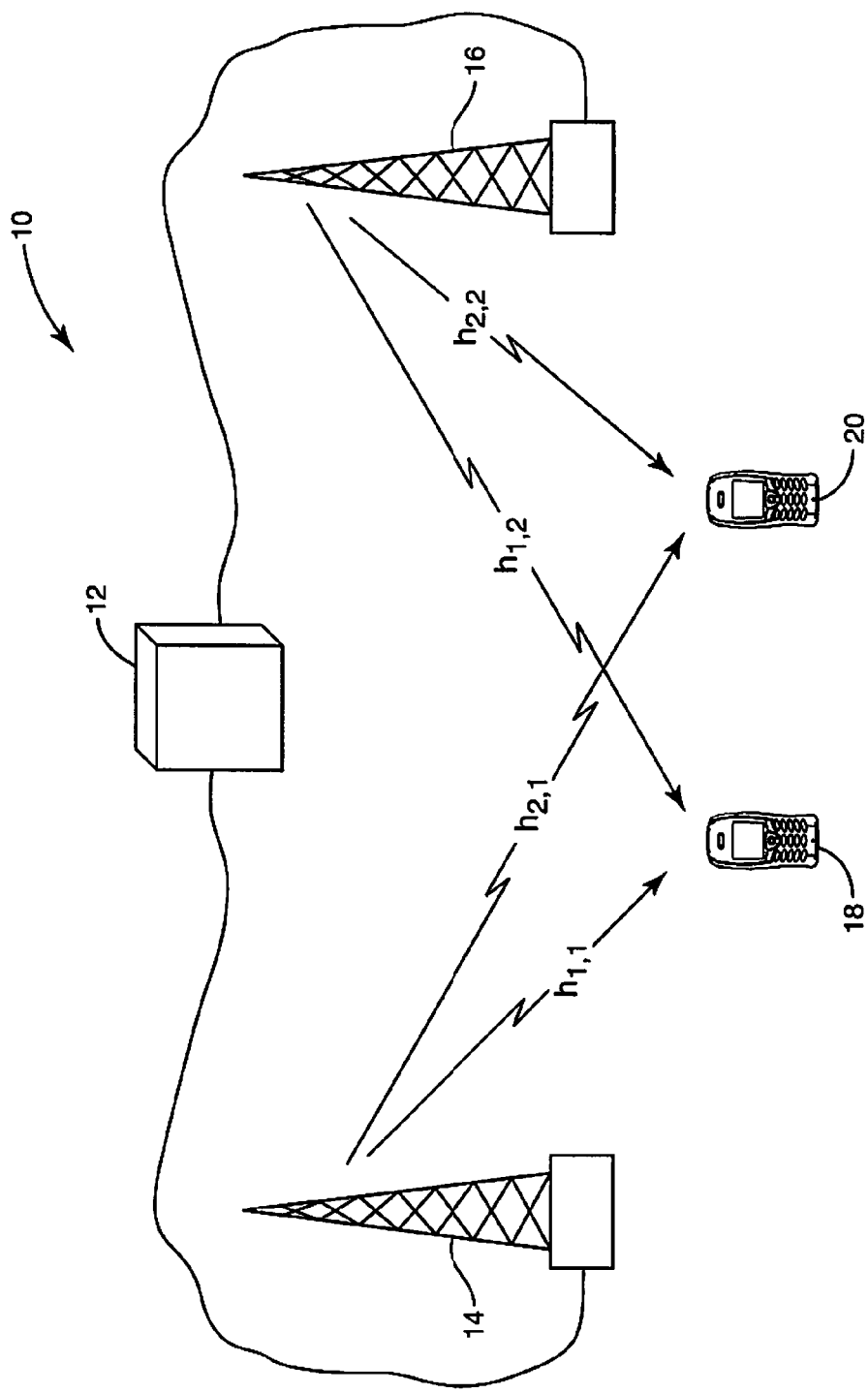
FIG. 1 is a functional block diagram of a COMP forward link.

FIG. 1 depicts a functional block diagram of an exemplary COMP wireless communication network 10. A controller 12 weights signals transmitted by each of at least two geographically distributed transmit antennas 14, 16. Signals from each antenna 14, 16 are received by each of at least two User Equipment (UE) 18, 20 in the operative area, or cell. Because both the transmit antennas 14, 16 and the UEs 18, 20 are geographically dispersed, in general, each UE 18, 20 will not receive signals from each transmit antenna 14, 16 with the same signal strength. Rather, due to path loss, signals transmitted by a closer antenna 14, 16 will be received strongly, and signals transmitted by a further antenna 14, 16 will be received weakly.

Cross interference is defined for a UE 18, 20 as the squared ratio of the channel variances of an interfering (i.e., more distant) antenna to that of a desired (i.e., closer) antenna. The performance of the COMP network depicted in FIG. 1—with two distributed antennas 14, 16 and two single-antenna UEs 18, 20—was simulated. In the simulation, it was assumed $E(|h_{1,1}|^2)=E(|h_{2,2}|^2)=1$, $E(|h_{1,2}|^2)=E(|h_{2,1}|^2)=\alpha^2$, where $\alpha \leq 1$ represents the cross interference.

Copending patent application published as WO 2010/036159 and titled "MU-COMP Channel State Ratio Quantization and Transmission," assigned to assignee of the present application and incorporated herein by reference in its entirety, describes a technique to reduce the reverse link overhead load caused by UEs reporting, or feeding back, CSI in MU-COMP. Briefly, the technique exploits the fact that interfering channels generally have a much lower signal strength than desired channels. Thus, the ratio of an element of the channel state, such as fast fading, of an interfering channel to a desired channel will be small, and can be quantized into only a small number of bits q. In particular, the ratio is modeled as a ratio of complex Gaussian random variables with unit variance. The ratio is quantized separately in amplitude and phase, into values of bit length $q_1$ and $q_2$.

Figure 2:
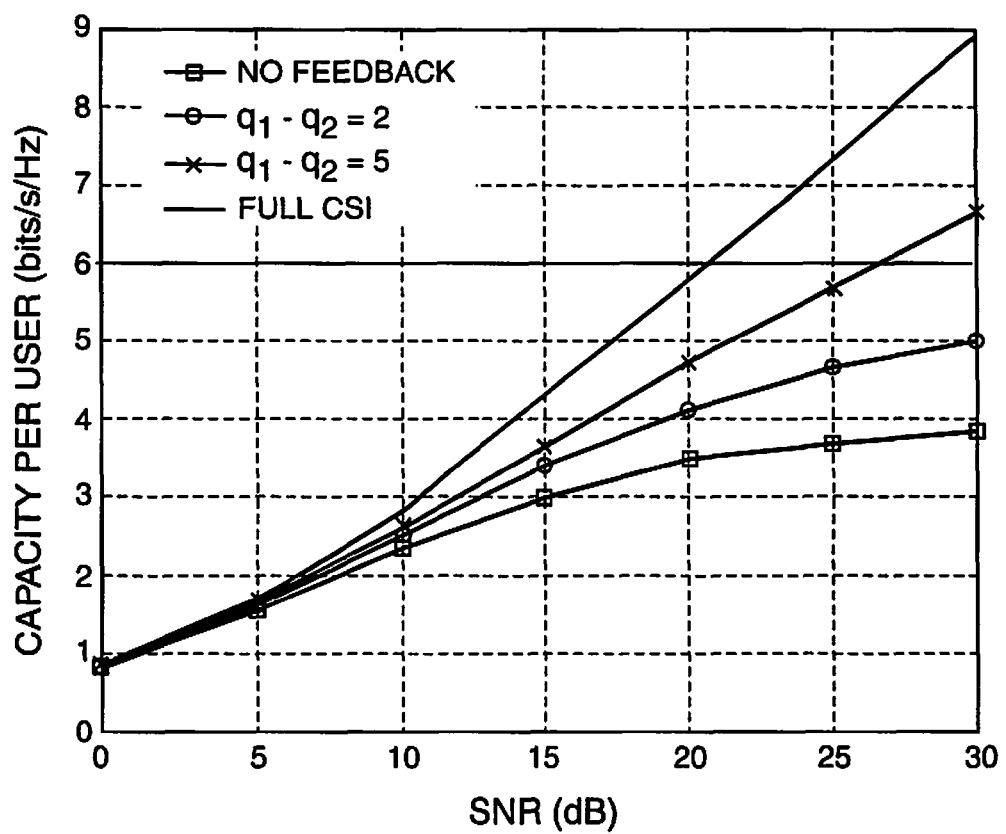
FIG. 2 is a graph plotting capacity vs. SNR for various feedback schemes for a COMP with cross interference of 0.2.
Figure 3:
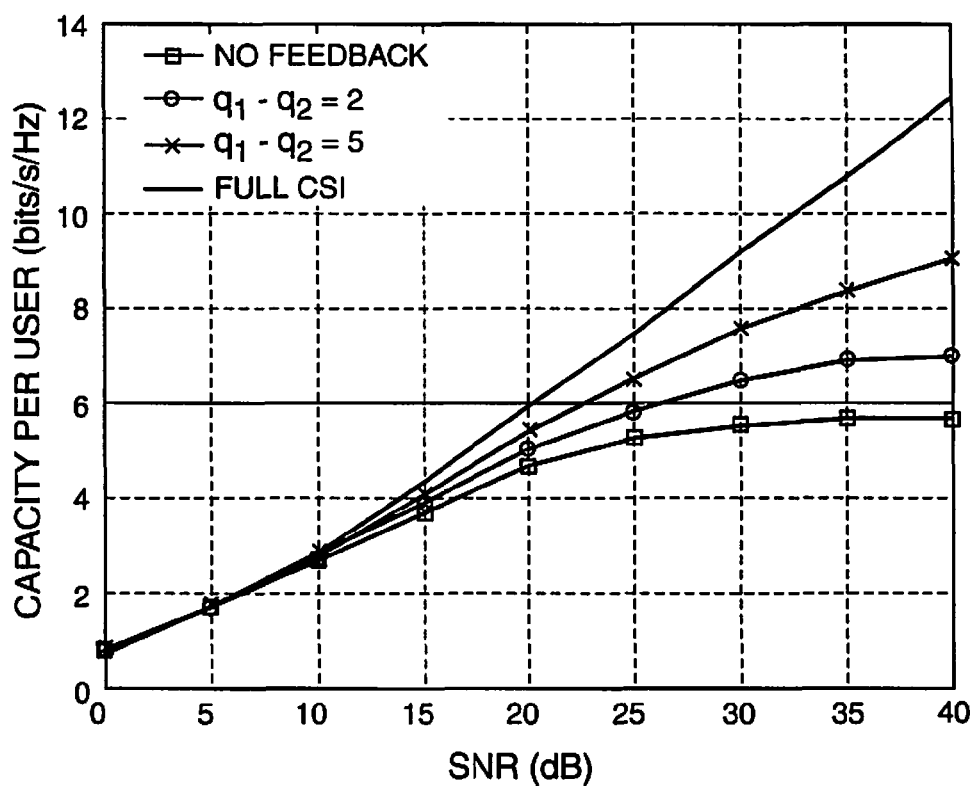
FIG. 3 is a graph plotting capacity vs. SNR for various feedback schemes for a COMP with cross interference of 0.1.
Figure 4:
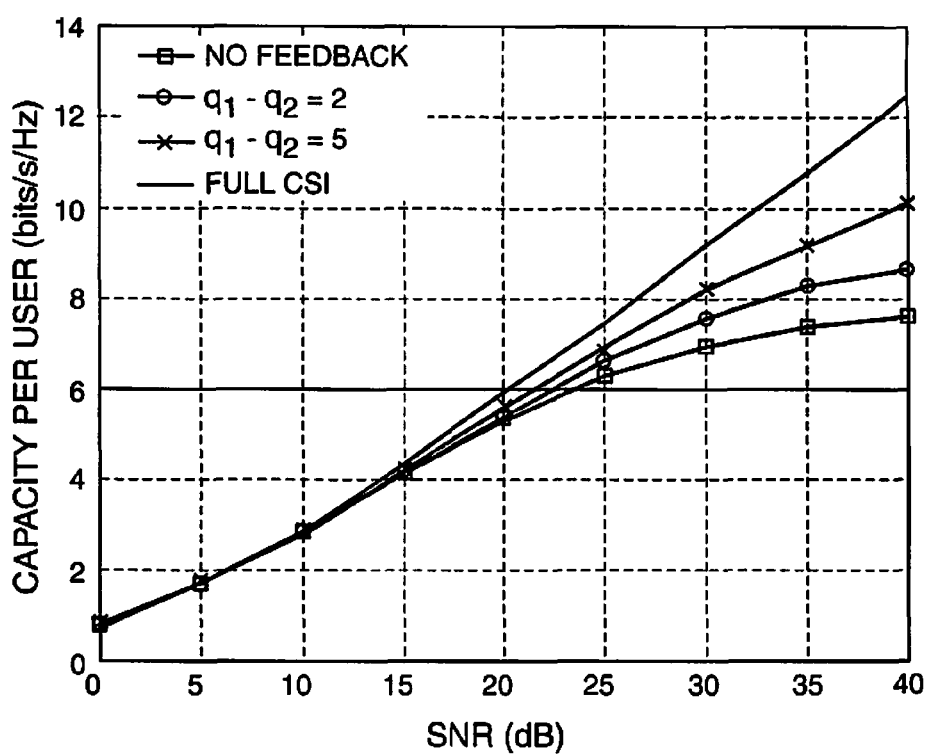
FIG. 4 is a graph plotting capacity vs. SNR for various feedback schemes for a COMP with cross interference of 0.05.

FIG. 2 depicts the simulation results for a cross interference of 0.2; FIG. 3 depicts the simulation results for a cross interference of 0.1; and FIG. 4 depicts the simulation results for a cross interference of 0.05. The graphs plot capacity as a function of SNR for different amounts of feedback—no feedback, $q_1=q_2=2$, $q_1=q_2=5$, and full CSI—for the specified cross interference level.

Assume users have a QoS requirement of 6 bits/s/Hz in capacity at a SNR of 30 dB. From FIGS. 2, 3, and 4, one observes that this requirement can be satisfied with $q_1=q_2=5$ when the cross interference is 0.2, $q_1=q_2=2$ when the cross interference is 0.1; and no feedback is needed when the cross interference is 0.05.

The results reveal that when the cross interference is large, such as when a user is close to an interfering antenna, more channel state feedback information is needed. On the other hand, when the cross interference is small, such as when a user is some distance from any interfering antenna, the amount of the required feedback information is smaller.

According to one or more embodiments of the present invention, the cross interference is controlled by user selection and grouping. Users in the same group use the same time/frequency resource (or resource block), and are hence geographically separated, preferably by at least a reuse pattern distance, to maintain the cross interference below a desired level. Different groups use different resource blocks. Accordingly, users close together but in different groups do not experience cross interference.

Figure 5:
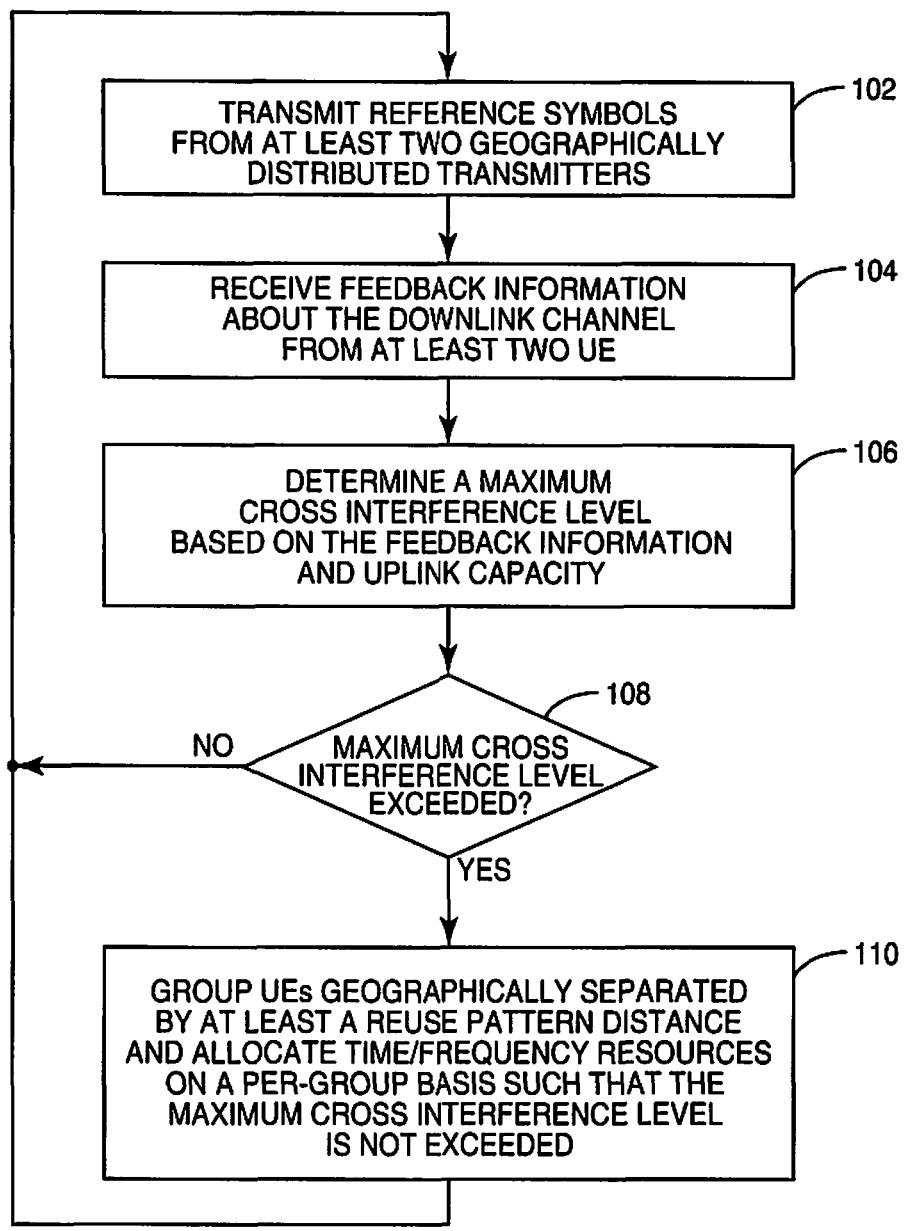
FIG. 5 is a flow diagram of a method of grouping COMP users.

FIG. 5 depicts a flow diagram of a method 100 of user selection and grouping. While those of skill in the art will recognize that the method 100 is ongoing continuously, for the purpose of explanation, the method 100 "begins" by transmitting reference signals from at least two geographically distributed transmit antennas 14, 16 (block 102). A channel element, such as the large scale fading, is measured for each distributed transmitter 14, 16 and UE 18, 20 pair, and the network receives this information as feedback in the reverse link (block 104). The COMP determines a maximum cross interference level $\alpha_{req}$ that can be supported, based on the available reverse link capacity for feedback (block 106). If this maximum cross interference level $\alpha_{req}$ is exceeded (block 108), geographically separate UEs 18, 20 are divided into as few groups as possible, and the groups are allocated different resource blocks (block 110). The grouping is done with the constraint that the cross interference does not exceed $\alpha_{req}$. This grouping method can be formulated into the following mathematical form: Find an optimal partition for users indexed 1, 2, 3, ..., K $$S_{opt} = \underset{S}{\mathrm{argmin}}(\#S),$$

where $S=\{S_1, S_2, \ldots\}$ is any possible partition such that for any set $S_i \subset S$, $\alpha_{m,n} \leq \alpha_{req}$ is satisfied for m,n $\in S_i$, m≠n. $\alpha_{m,n} \leq \alpha_{req}$ is the cross interference level between user m and user n. An exhaustive search for the optimal partition is always possible, although the complexity grows at least exponentially with the number of nodes involved. The system then continues to monitor performance (block 102).

Figure 6:
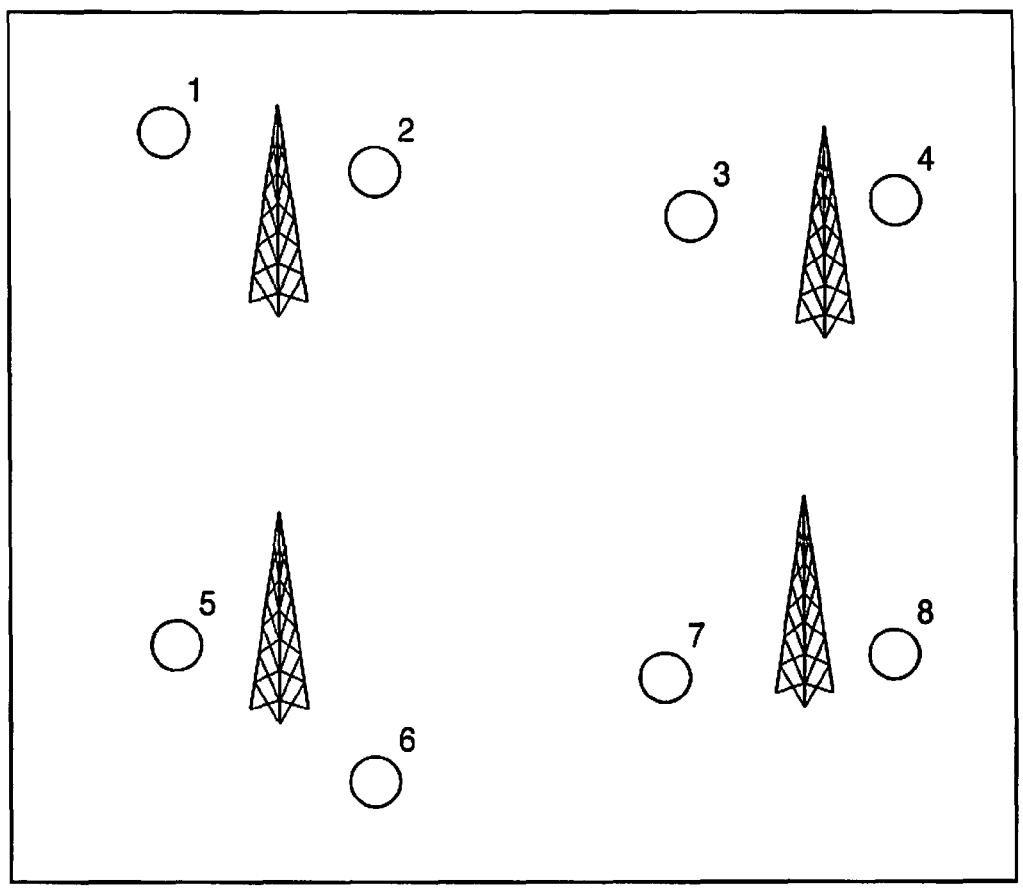
FIG. 6 is a diagram of the distribution of users in a COMP.

FIG. 6 depicts a representative distribution of users 1-8 and transmitting antennas in a COMP. When the reverse link capacity is sufficient to support a high level of channel state feedback, the users are divided into two groups {1, 3, 5, 7} and {2, 4, 6, 8}, and each group is allocated different resource blocks. The users in each group are sufficiently geographically dispersed that they do not interfere with each other. In this case, each resource block allocated can support four users simultaneously, and the capacity is relatively large. When less feedback can be supported due to reverse link capacity constraints, these users are divided into four groups {1, 7}, {2, 8}, {3, 5}, and {4, 6}. Again, the users in each group are separated from each other, and each group is allocated a different resource block. With this grouping, all users' QoS can be satisfied. However, each resource block only supports two users simultaneously, hence the overall system capacity decreases.

Embodiments of the present invention provide a user grouping method to tradeoff the COMP forward link capacity and required reverse link feedback, which makes the design of COMP practical and flexible. In particular, flexibility is introduced in at least two respects. First, with increased reverse link capacity that can support more channel state feedback, the separation of users in the same group can be decreased. Thus, more users can be included in each group and the system capacity is increased. Second, when the reverse link capacity is constrained, the separation of users in each group is increased. In this case, all users' QoS can be satisfied, at the cost of some loss in the overall system capacity.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of operating a transmitter in a Multi-User Distributed Antenna System (MU-COMP) wireless communication network comprising at least two geographically distributed transmitters and in which at least two User Equipments (UE) are receiving signals, comprising:
   transmitting reference signals from each transmitter;
   receiving from each UE feedback information about the forward link channel state, calculated by the UE from received reference signals; and
   grouping UEs and allocating time/frequency resources on a per-group basis, based on reverse link capacity,
   wherein grouping UEs comprises determining a maximum cross interference level based on users' quality of service requirement and reverse link capacity, and grouping the UEs such that the determined maximum cross interference level is not exceeded.

2. The method of claim 1 wherein grouping the UEs such that the determined maximum cross interference level is not exceeded comprises forming the fewest groups possible that do not exceed the determined maximum cross interference level.

3. The method of claim 1, wherein the UEs in each group are as geographically separated as a time/frequency resource reuse pattern distance.

4. A method of operating a transmitter in a Multi-User Distributed Antenna System (MU-COMP) wireless communication network comprising at least two geographically distributed transmitters and in which at least two User Equipments (UE) are receiving signals, comprising:

transmitting reference signals from each transmitter;

receiving from each UE feedback information about the forward link channel state, calculated by the UE from received reference signals; and grouping UEs and allocating time/frequency resources on a per-group basis, based on reverse link capacity, wherein the feedback information about the forward link channel state comprises a quantized measure of the ratio of channel elements for a channel relatively weakly received by a UE from a first transmitter to that for a channel relatively strongly received by the UE from a second transmitter.

5. A transmitter in a Multi-User Distributed Antenna System (MU-COMP) wireless communication network, including at least two geographically distributed transmitters, each transmitting reference signals, the transmitter comprising a controller operative to receive feedback information regarding the forward link channel state from at least two User Equipment (UE) and further operative to group the UEs and allocate time/frequency resources on a per-group basis, based on reverse link capacity, wherein the controller is further operative to determine a maximum cross interference level based on users' quality of service requirement and reverse link capacity, and to group the UEs such that the determined maximum cross interference level is not exceeded.

6. The transmitter of claim 5 wherein the controller is further operative to form the fewest groups possible that do not exceed the determined maximum cross interference level.

7. The transmitter of claim 5, wherein the UEs in each group are as geographically separated as a time/frequency resource reuse pattern distance.

\* \* \* \* \*